(12) United States Patent
Ronkainen et al.

(10) Patent No.: US 11,031,975 B2
(45) Date of Patent: Jun. 8, 2021

(54) TRANSCEIVER POINT, METHOD, AND COMPUTER PROGRAM FOR REALLOCATING TRANSMISSION OF BEAMS

(71) Applicant: Telefonaktiebolaget LM Ericsson (publ), Stockholm (SE)

(72) Inventors: Henrik Ronkainen, Södra Sandby (SE); Christer Östberg, Staffanstorp (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/764,909

(22) PCT Filed: Dec. 5, 2017

(86) PCT No.: PCT/SE2017/051217
§ 371 (c)(1),
(2) Date: May 18, 2020

(87) PCT Pub. No.: WO2019/112496
PCT Pub. Date: Jun. 13, 2019

(65) Prior Publication Data
US 2020/0343942 A1   Oct. 29, 2020

(51) Int. Cl.
*H04B 7/024* (2017.01)
*H04W 56/00* (2009.01)
(Continued)

(52) U.S. Cl.
CPC .......... *H04B 7/024* (2013.01); *H04W 56/001* (2013.01); *H04W 72/046* (2013.01);
(Continued)

(58) Field of Classification Search
CPC .............. H04L 1/0057; H04W 56/001; H04W 72/046; H04W 72/08; H04W 88/08; H04B 74/0833; H04B 7/024
See application file for complete search history.

(56) References Cited

U.S. PATENT DOCUMENTS

2017/0289932 A1   10/2017   Islam et al.
2018/0220360 A1*   8/2018   Sheng .................. H04J 11/0073
(Continued)

FOREIGN PATENT DOCUMENTS

WO   2018064271 A1   4/2018

OTHER PUBLICATIONS

Spectrum Communications, "Indication of the SS-Block Index in Multi-Beam Cases", 3GPP TSG RAN WG1 AH_NR Meeting, Spokane, USA, Jan. 16, 2017, pp. 1-4, R1-1700288, 3GPP.
(Continued)

*Primary Examiner* — Sung S Ahn
(74) *Attorney, Agent, or Firm* — Coats & Bennett, PLLC

(57) ABSTRACT

There is provided a Transceiver Point, TRXP, arranged to operate in a multi-TRXP cell deployment, where a plurality of TRXPs of the multi-TRXP cell deployment operate under a same cell identity, ID, and arranged to consecutively transmit a plurality of synchronisation signal blocks, SSBs, in a plurality of beams in different directions, respectively, during a synchronisation signal block burst. The TRXP is arranged to reallocate the transmission of the SSB beams to a receiving entity. A method for the TRXP and a computer program for implementing the method are also disclosed.

21 Claims, 9 Drawing Sheets

(51) Int. Cl.
  *H04W 72/04* (2009.01)
  *H04W 72/08* (2009.01)
  *H04W 74/08* (2009.01)
  *H04W 88/08* (2009.01)

(52) U.S. Cl.
  CPC ....... *H04W 72/08* (2013.01); *H04W 74/0833* (2013.01); *H04W 88/08* (2013.01)

(56) References Cited

U.S. PATENT DOCUMENTS

2018/0279243 A1* 9/2018 Sadiq .................... H04L 1/189
2019/0223174 A1* 7/2019 Shimizu ............... H04B 7/0695

OTHER PUBLICATIONS

Asustek, "Synchronization in NR Considering Beam Sweeping", 3GPP TSG RAN WG1 Meeting #88, Athens, Greece, Feb. 13, 2017, pp. 1-3, R1-1703053, 3GPP.

Huawei et al., "Synchronization Signal Design in NR", 3GPP TSG RAN WG1 Meeting #86bis, Lisbon, Portugal, Oct. 10, 2016, pp. 1-5, R1-1608846, 3GPP.

* cited by examiner

*One cell using 4 TRXPs*

*One cell using 3 TRXPs*

*SSB beams, also used for Random Access*

Beam relation estimation phase

Beam coordination phase

TRANSCEIVER POINT, METHOD, AND COMPUTER PROGRAM FOR REALLOCATING TRANSMISSION OF BEAMS

TECHNICAL FIELD

The present invention generally relates to a transceiver point (TRXP), method and computer program for re-allocating transmission of beams with synchronisation signal blocks (SSB). In particular, the invention relates to operation in a multi-TRXP cell deployment, where a plurality of TRXPs of the multi-TRXP cell deployment operate under a same cell identity, ID, and are arranged to consecutively transmit a plurality of synchronisation signal blocks, SSBs, in a plurality of beams in different directions, respectively, during a synchronisation signal block burst.

BACKGROUND

When an electronic transceiver device, such as User Equipment (UE), wishes to connect to a wireless cellular communication system, for example after power-on or when waking up after an extended sleep period, it goes through an initial-access procedure. The first step of this procedure is typically that the electronic transceiver device searches for and detects a synchronization signal that is regularly broadcast by the network access nodes. After successful time-frequency alignment, the electronic transceiver device may listen for additional information from the network, e.g. so-called system information, and/or respond with a request to join the network. This is often referred to as physical random access channel message, or Physical Random Access Channel (PRACH) message). The electronic transceiver device is typically not allowed to send the request to join at an arbitrary time, since that could conflict with other transmissions in the system, but should rather send it at a predefined time interval after a predefined downlink signal, e.g. a synchronisation signal including system information, was received.

Cellular systems may use advanced antenna systems containing large antenna arrays for data transmission. With such antenna arrays, data signals may be transmitted in narrow beams to increase signal strength in some directions, and/or to reduce interference in other directions. On the one hand, this is done to obtain improved link quality and to enable spatial separation and reduce interference between users. On the other hand, using arrays is necessary to ensure sufficient link quality in high-frequency deployments where the individual antenna element apertures are small and do not capture sufficient signal energy individually. Coherently aligning the antenna elements gives rise to effective beam gain, but also beam directivity in a certain direction.

When a mobile terminal device or UE (User Equipment) doesn't have an active user plane connection to the network, or when the uplink channel cannot be considered to be fully synchronized with the network, it performs a Random Access (RA) to (re-)establish a connection. The general principles for RA procedure are very similar regardless of the cellular radio technology (e.g. WCDMA, LTE, NR/5G). First, the UE must acquire the RA configuration, where some parts may be specified (i.e. defined by the standard) and other parts may typically be broadcasted from the network. The RA configuration may include information about:

Timing, i.e. when the UE can send a random access and when a corresponding RA response (RAR) will be received. The timing information is defined in relation to a downlink frame boundary. The network nodes/base stations monitor potential RA attempts during this RA reception window.

Output power level. Typically calculated based on the measured power/quality of known downlink reference signal.

Signature generation. Defines rules to the UE for how to generate a random preamble signature to allow several UEs perform a random access at the same RA occasion.

In coming systems, a cell may be built up from several different Transmission Reception Points or Transceiver Points (TRXPs). I.e., all the TRXPs in this cell will transmit/broadcast the same SSB and the same cell identity. Using same SSB time index from different TRXPs in a multi-TRXP cell deployment may cause a beam-forming capable UE to direct its energy/transmission in several different directions (to many TRXPs) when sending its RACH. This may require that the RA receivers must combine these receptions to be able to detect the RA. I.e. all RACH raw data should be shared between all TRXPs, which put demand on very fast transport network between nodes to fulfil timing requirements. Furthermore, the UE selects its RACH power based on the measured SSB and if there are independent RACH receivers in each TRXP, this power may be wrong as the measured power reflects the Single Frequency Network (SFN) combined power from several nodes. An approach of using unique SSB time index for each SSB beam in a multi-TRXP cell deployment may require wider beams due to lack of beam/time indices, which may cause less coverage from each TRXPs, or may cause issues due to a limited number of TRXPs in a multi-TRXP cell by the range of SSB time indices. Still further, beam planning for a multi-TRXP cell deployment may cause some issues. To find a suitable SSB beam/time index configuration in a multi-TRXP cell deployment may be very hard beforehand and may have to be reconfigured later on due to changed conditions, such as new neighbour sites, new buildings, trees etc. If the same time-index is shared between beams, a configuration where overlapping beams from different TRXPs have the same time-index may be desired, or the opposite depending on TRXP capability.

It is therefore a desire to alleviate the issues implied by a multi-TRXP cell deployment where each TRXP is broadcasting using beamforming.

SUMMARY

The invention is based on the inventors' understanding that a Transceiver Point, TRXP, when arranged to operate in a multi-TRXP cell deployment, where a plurality of TRXPs of the multi-TRXP cell deployment operate under a same cell identity, ID, and when arranged to consecutively transmit a plurality of synchronisation signal blocks, SSBs, in a plurality of beams in different directions, respectively, during a synchronisation signal block burst, may cause unwanted effects, or may be used to cause wanted effects. The inventors have suggested a lean approach for handling this.

According to a first aspect, there is provided a Transceiver Point, TRXP, arranged to operate in a multi-TRXP cell deployment, where a plurality of TRXPs of the multi-TRXP cell deployment operate under a same cell identity, ID, and arranged to consecutively transmit a plurality of synchronisation signal blocks, SSBs, in a plurality of beams in different directions, respectively, during a synchronisation signal block burst. The TRXP is arranged to re-allocate the transmission of the SSB beams for enabling a receiving entity of the SSB beam transmissions to improve synchronisation signal reception compared with what is feasible before the re-allocation.

The re-allocation may comprise allocation of SSB beam transmissions such that the receiving entity is less likely than before the re-allocation to receive simultaneous SSB beams from two or more of the plurality of the TRXPs of the cell.

Alternatively, the re-allocation may comprise allocation of SSB beam transmissions such that the receiving entity is more likely than before the re-allocation to receive simultaneous SSB beams from two or more of the plurality of the TRXPs of the cell.

The TRXP may comprise a receiver arranged to receive transmission information from other TRXPs of the multi-TRXP cell deployment, wherein the TRXP is arranged to determine TRXP beam relationships on which the re-allocation of the transmission of the SSB beams is based.

The re-allocation of the transmission of the SSB beams may be arranged such that a time index of beams used by other TRXPs of the multi-TRXP cell deployment is reusable by the TRXP.

The TRXP may be arranged to receive random access, RA, transmissions from UEs of the cell, share information about the received RA transmissions, and receive information about received RA transmissions from other TRXPs of the multi-TRXP cell deployment. The re-allocation of the transmission of the SSB beams may be based on RA receptions from User Equipments, UEs, of the cell. The re-allocation procedure may be performed where determinations are based on reception history of RA transmissions from UEs of the cell such that real-time coordination between the TRXPs of the multi-TRXP cell deployment is avoided. The TRXP may be arranged to save antenna data of the received RA transmissions from UEs of the cell during a RA receive window associated with an SSB beam, wherein the information about the received RA transmissions to be shared comprises information related to the saved antenna data. The shared information related to the saved antenna data may comprise information about RA receptions, which are associated with respective SSB beam from UEs of the cell, during the RA receive window. The TRXP may be arranged to receive the information about received RA transmissions from other TRXPs of the multi-TRXP cell deployment related to saved antenna data from at least a subset of the other TRXPs of the multi-TRXP cell deployment, where the saved antenna data is related to a RA receive window associated with an SSB beam. Exchange of information about received RA transmissions from other TRXPs of the multi-TRXP cell deployment related to saved antenna data may be performed via a remote centralised coordination entity. Alternatively, the exchange of information about received RA transmissions from other TRXPs of the multi-TRXP cell deployment related to saved antenna data may be performed directly between TRXPs.

The TRXP may comprise allocation circuitry arranged to collect information about RA transmissions within the cell, aggregate at least a subset of the collected information, and provide a re-allocation scheme for the transmission of the SSB beams based on the aggregated information.

According to a second aspect, there is provided a method performed by a Transceiver Point, TRXP, arranged to operate in a multi-TRXP cell deployment, where a plurality of TRXPs of the multi-TRXP cell deployment operate under a same cell identity, ID, and arranged to consecutively transmit a plurality of synchronisation signal blocks, SSBs, in a plurality of beams in different directions, respectively, during a synchronisation signal block burst. The method comprises re-allocating the transmission of the SSB beams transmitted by the TRXP for enabling a receiving entity of the SSB beam transmissions to improve synchronisation signal reception compared with what is feasible before the re-allocation.

The re-allocating may comprise allocating SSB beam transmissions such that the receiving entity is less likely than before the re-allocation to receive simultaneous SSB beams from two or more of the plurality of the TRXPs of the cell.

Alternatively, the re-allocating may comprise allocating SSB beam transmissions such that the receiving entity is more likely than before the re-allocation to receive simultaneous SSB beams from two or more of the plurality of the TRXPs of the cell.

The method may comprise receiving transmission information from other TRXPs of the multi-TRXP cell deployment, and determining TRXP beam relationships, wherein the re-allocating of the transmission of the SSB beams is based on the received transmission information.

The re-allocating of the transmission of the SSB beams may comprise arranging that a time index of beams used by other TRXPs of the multi-TRXP cell deployment is reusable by the TRXP.

The method may comprise receiving random access, RA, transmissions from UEs of the cell, sharing information about the received RA transmissions, and receiving information about received RA transmissions from other TRXPs of the multi-TRXP cell deployment. The re-allocating may be performed on determinations based on reception history of RA transmissions from UEs of the cell such that real-time coordination between the TRXPs of the multi-TRXP cell deployment is avoided. The method may comprise saving antenna data of the received RA transmissions from UEs of the cell during a RA receive window associated with an SSB beam, wherein the sharing of information about the received RA transmissions comprises sharing information related to the saved antenna data with at least a subset of the other TRXPs of the multi-TRXP cell deployment. The shared information related to the saved antenna data may comprise information about RA receptions, which are associated with respective SSB beam from UEs of the cell, during the RA receive window. The method may comprise receiving information about received RA transmissions from other TRXPs of the multi-TRXP cell deployment related to saved antenna data from at least a subset of the other TRXPs of the multi-TRXP cell deployment, where the saved antenna data is related to a RA receive window associated with an SSB beam. Exchanging of information about received RA transmissions from other TRXPs of the multi-TRXP cell deployment related to saved antenna data may be performed via a remote centralised coordination entity. The exchanging of information about received RA transmissions from other TRXPs of the multi-TRXP cell deployment related to saved antenna data may be performed directly between TRXPs.

The method may comprise collecting information about RA transmissions within the cell, aggregating at least a subset of the collected information, and providing a re-allocation scheme for the transmission of the SSB beams based on the aggregated information. The method may comprise forming statistics on the collected information about RA transmissions within the cell, wherein the providing of the re-allocation scheme for the transmission of the SSB beams is based on the statistics.

According to a third aspect, there is provided a computer program comprising instructions which, when executed on a processor of a Transceiver Point, TRXP, causes the TRXP to perform the method according to the second aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

In the following description, a solution which, implicitly or explicitly, identifies relationships between beams from different TRXPs in a multi-TRXP cell deployment. The TRXP beam relationships may be estimated by offline calculation of recorded antenna data related to neighbour TRXP transmissions and RA history, and own transmission history. This provides for feasibility of complex cells comprising a plurality of TRXPs and still keeping a moderate demand on speed of coordination between TRXPs at UE RA. At least some of the embodiments demonstrated herein provides for reconfiguration of beam allocation such that time index may be reused and/or shared between different beams from different TRXPs to enable the multi-TRXP cell deployment. This provides for a neat beam planning when using multi-TRXP cell deployment, and also when adjacent cells use a similar RA configuration. In at least some embodiments, the network nodes may reconfigure beam allocation such that RA reception is improved, and the approach is flexibly applicable depending on respective TRXP capability. The approaches are readily expandable to inter-cell application such that neighbour relation information may be used in e.g. mobility scenarios.

Figure 1:
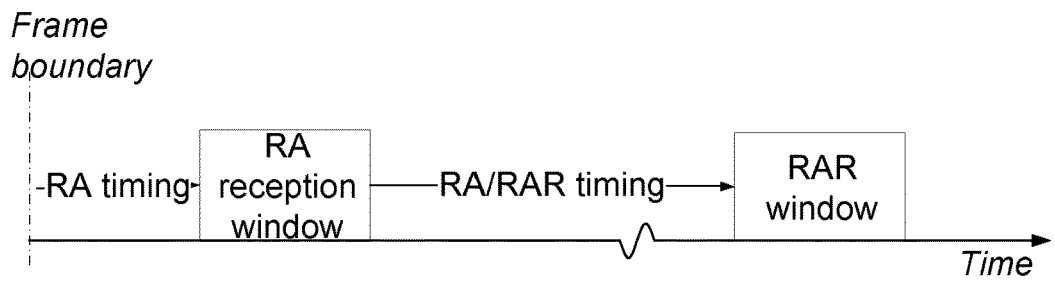
FIG. 1 is a timing diagram schematically illustrating a principle for random access, RA, timing in LTE.

FIG. 1 is a timing diagram schematically illustrating a principle for RA timing in LTE. The network nodes, i.e. base stations or eNodeBs, monitor the complete cell area during the RA reception window.

In coming cellular networks, higher frequencies will be used and high carrier frequencies suffer from high propagation loss which in practice implies reduced coverage. To overcome this coverage loss, narrow beam transmission and reception schemes will be needed, where the radio signal is transmitted/received in different spatial directions which will be enabled by introduction of antenna elements arrays.

To establish UE downlink synchronization in such systems, the network may periodically transmit a Synchronization Signal Block (SSB), which in addition to the synchronization signals such as Primary Synchronisation Signal and Secondary Synchronisation Signal (PSS/SSS), also includes information for how to acquire RA information. The latter is included in a Physical Broadcast Channel (PBCH) part of the SSB. The PBCH may include information for how to read Remaining Minimum System Information (RMSI) which includes the detailed RA configuration information.

Figure 2:
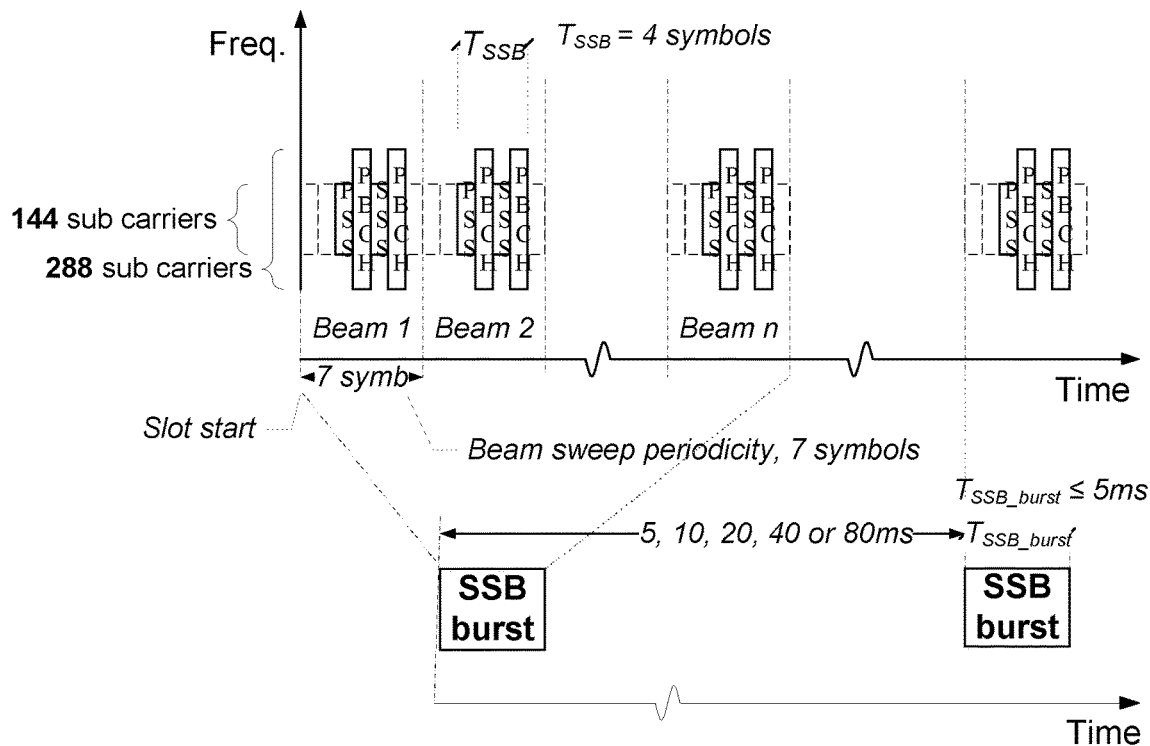
FIG. 2 is a timing diagram schematically illustrating a principle for synchronisation signal block, SSB, transmission with beam sweeping.
Figure 3:
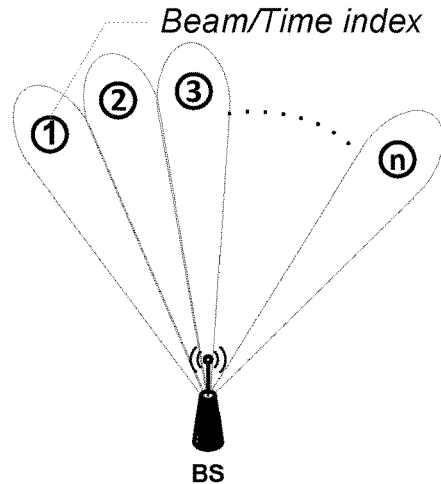
FIG. 3 schematically illustrates a base station performing beam sweeping, and principles for beam and time index.

To compensate for the high propagation loss caused by high frequencies, the SSB may be swept in different beams during one SSB burst. FIG. 2 is a timing diagram schematically illustrating a principle for synchronisation signal block, SSB, transmission with beam sweeping. FIG. 3 schematically illustrates a base station performing beam sweeping, and principles for beam and time index. As each SSB is very short and occupies few resources, several beams may be swept in a short period of time, where each transmission includes the same information, except for a time index which enables the UE to calculate the frame boundary. That is, there is a relation between timing within a SSB burst and its spatial properties, i.e. what part of the cell the beam covers at each time instant, which is used in the approaches demonstrated below. The repetitive properties thereof enable collecting information about actions and performance in the cell, and by reallocation of beams based on the collected information improved performance is achievable during operation.

The coverage issue at high frequencies discussed above is present also for the RA procedure. For the system popularly referred to as 5G, being specified by $3^{rd}$ Generation Partnership Project (3GPP), it has been agreed to divide the RA transmission/reception in different beams of a cell to compensate for the high propagation loss. In case beam sweeping is used, the UE measures the power/quality of the SSS and/or PSS in different SSB beams and selects the best as reference for the RA procedure. Depending on selected SSB beam, there is a corresponding RA reception window to enable beam identification in the base station (BS). This beam identification is then used by the BS when beamforming the upcoming signalling towards the accessing UE.

Figure 4:
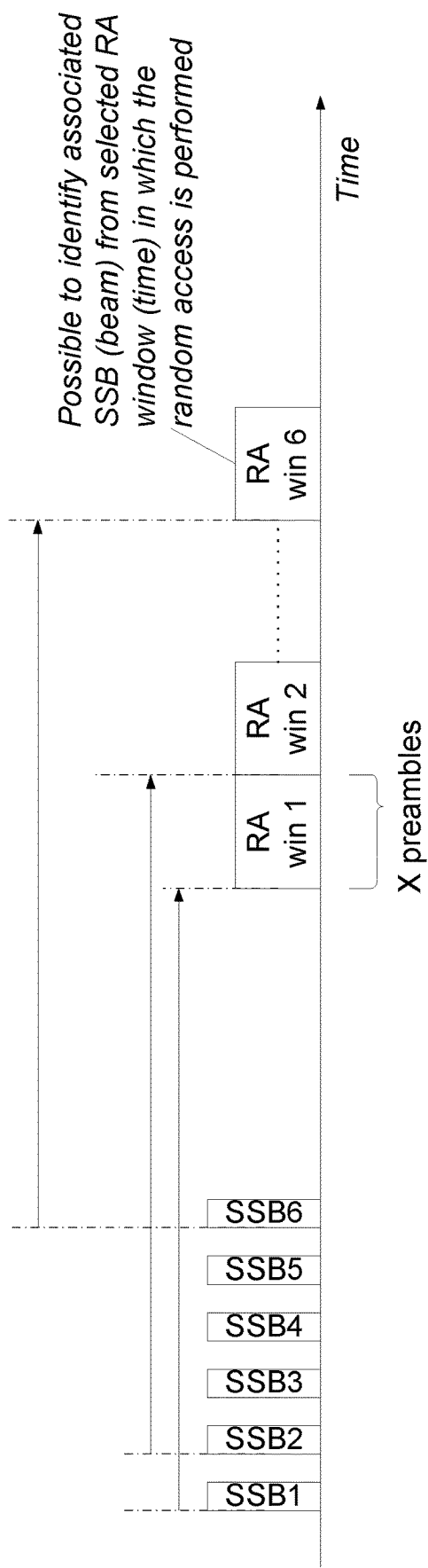
FIG. 4 is a timing diagram schematically illustrating mapping between SSB beam and RA reception window according to one example.
Figure 5:
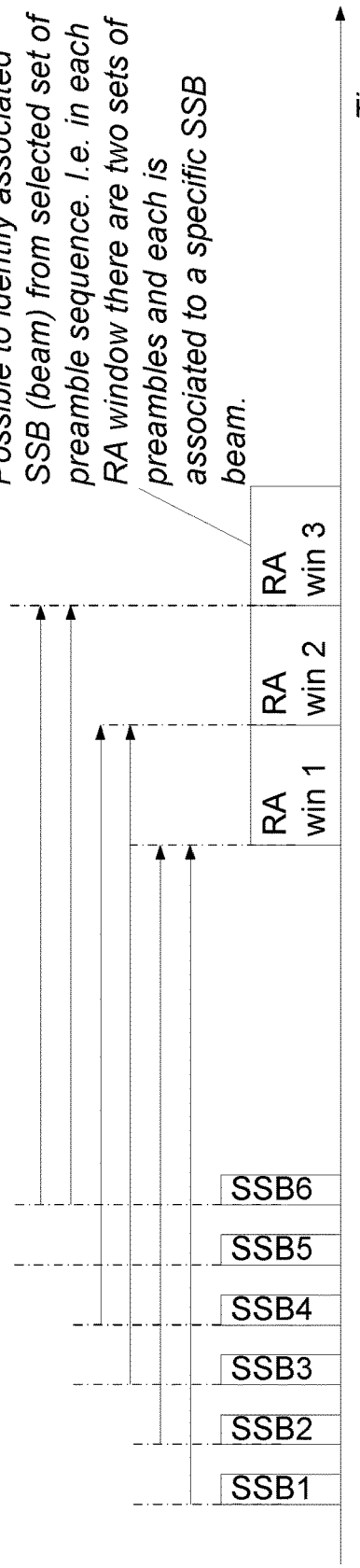
FIG. 5 is a timing diagram schematically illustrating mapping between SSB beam and RA reception window according to another example.

FIG. 4 is a timing diagram schematically illustrating mapping between SSB beam and RA reception window according to one example. Thus, there may be a one-to-one mapping between SSB-beam and RA-window. However, other schemes are possible where several SSB-beams are associated with one and the same RA reception window, but different sets of RA signatures are used by the UEs depending on selected SSB beam. FIG. 5 is a timing diagram schematically illustrating mapping between SSB beam and RA reception window according to this latter example.

Figure 6:
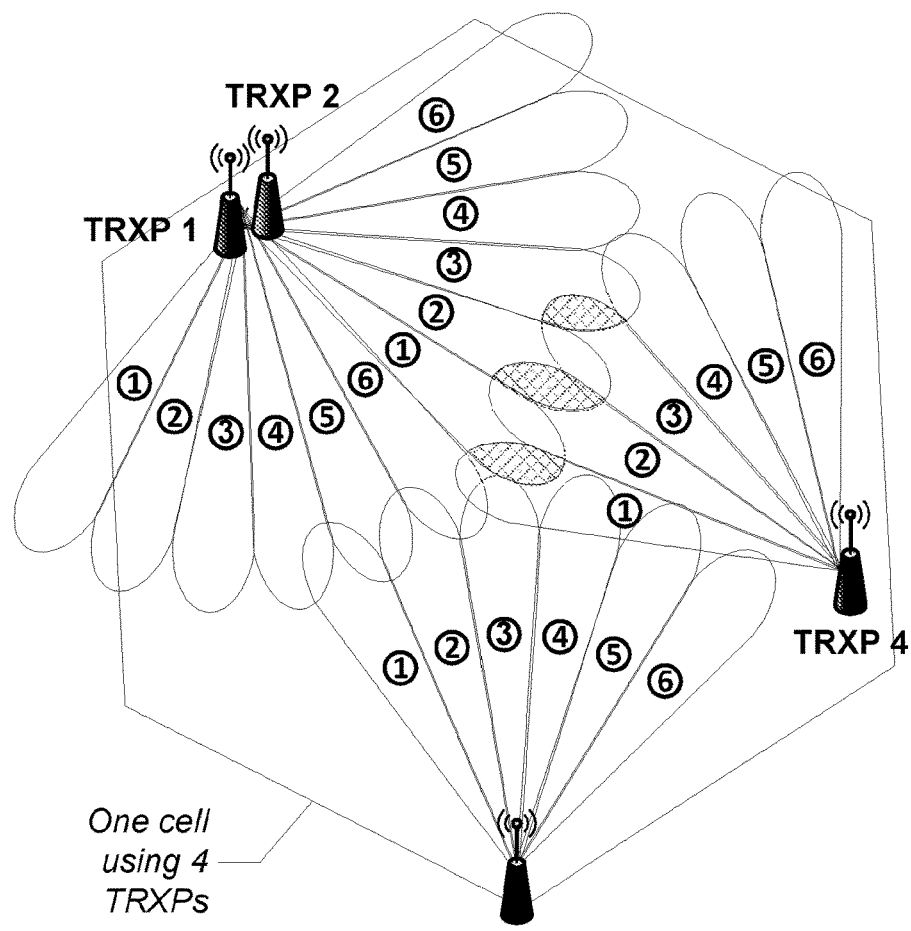
FIG. 6 schematically illustrates a multi-transceiver-point cell deployment, where a plurality of transceiver points, TRXPs, of a multi-TRXP cell deployment operate under a same cell identity, ID, and arranged to consecutively transmit a plurality of synchronisation signal blocks, SSBs, in a plurality of beams in different directions, respectively, during a synchronisation signal block burst.

FIG. 6 schematically illustrates a multi-transceiver-point cell deployment, where a plurality of transceiver points, TRXPs, of a multi-TRXP cell deployment operate under a same cell identity, ID, and arranged to consecutively transmit a plurality of synchronisation signal blocks, SSBs, in a plurality of beams in different directions, respectively, during a synchronisation signal block burst. The scotch-marked areas indicate parts of the cell where time and location of beams overlap. In some circumstances, a UE operating in any of these areas may encounter issues, depending on for example capabilities of the UE. This disclosure provides some suggestions on how to deal with this without adding excessive complexity to the participating entities.

Figure 7:
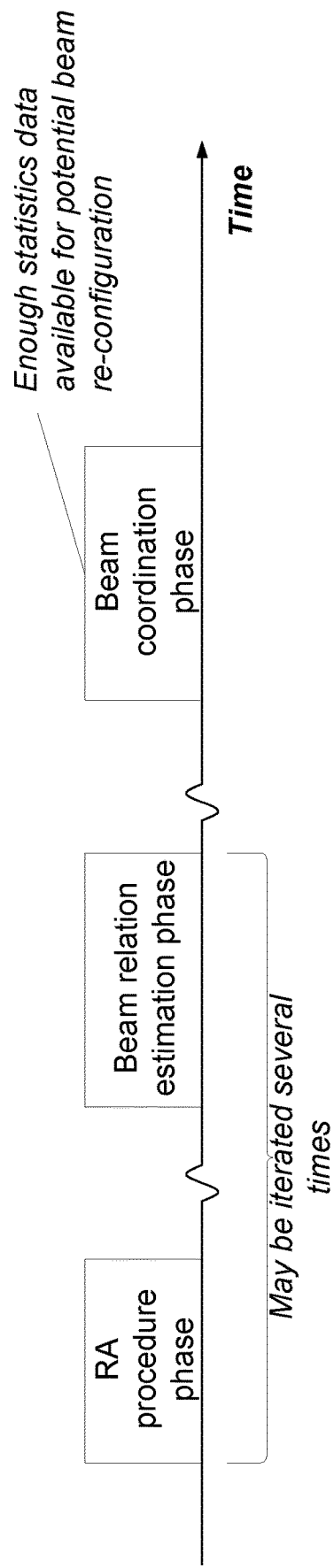
FIG. 7 is a timing diagram schematically illustrating processing phases for beam setup for a multi-TRXP deployment according to an embodiment.

FIG. 7 is a timing diagram schematically illustrating processing phases for beam setup for a multi-TRXP deployment according to an embodiment. The processing can be divided in three processing phases. In the first phase, RA reception is executed in each TRXP, or at least a subset of the TRXPs, of a multi-TRXP cell. During this phase, the TRXPs temporarily save antenna data captured during each RA receive window related to an SSB beam, respectively. At the end of the phase, the TRXPs inform each other about detected random access preambles. The information sharing/coordination can be performed directly between each of the TRXPs or by using a centralized coordination function.

In the second phase, the beam relation estimation phase, TRXPs perform an offline RA detection using saved data corresponding to the time interval in which random access preambles has been detected in other TRXPs in the same cell. At the end of the phase, the TRXPs inform each other about detected random access preambles in the offline RA reception processing. The information sharing/coordination can be performed directly between each of the TRXPs or by using a centralized coordination function at least for a subset of the TRXPs.

In the third phase, the beam coordination phase, the TRXPs or a central coordination function has gathered enough information about transmission history to decide on potential changes in the SSB beam configuration. Depending on the output from a beam reallocation algorithm, the nodes reconfigure the SSB beams accordingly.

Figure 8:
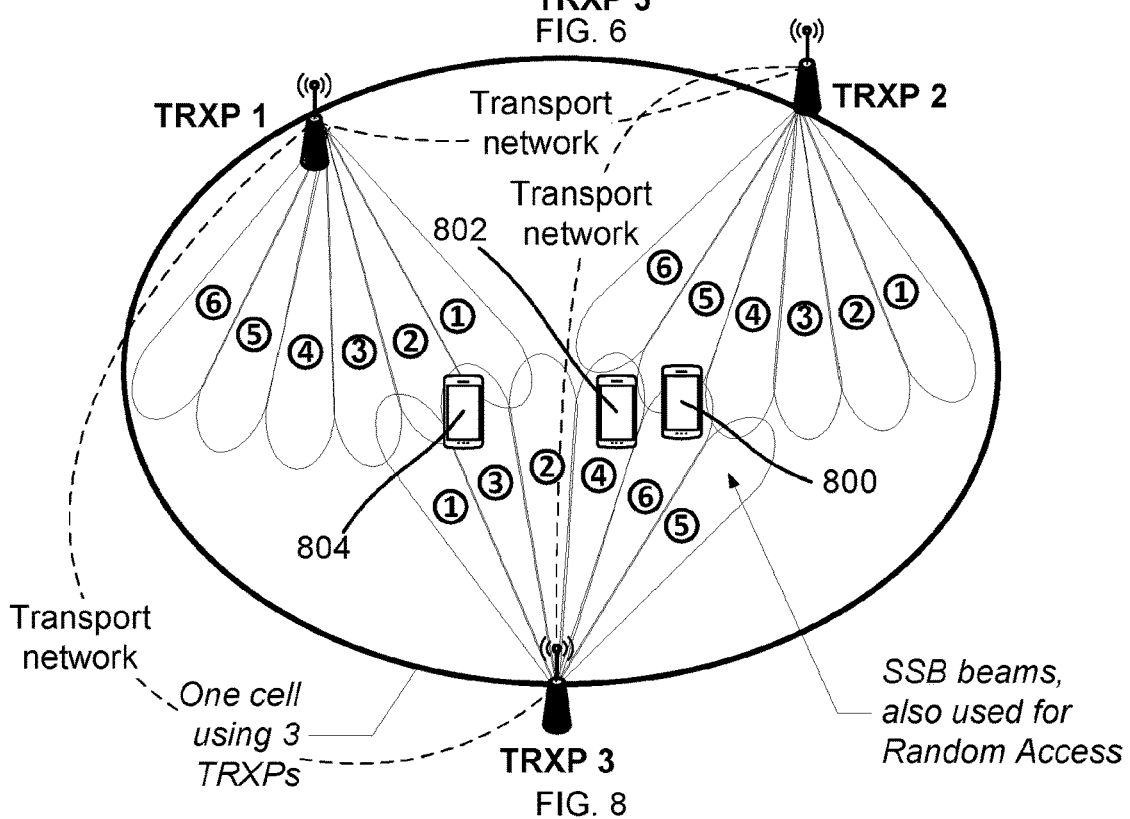
FIG. 8 schematically illustrates a multi-transceiver-point cell deployment, where a plurality of transceiver points, TRXPs, of a multi-TRXP cell deployment operate under a same cell identity, ID, and arranged to consecutively transmit a plurality of synchronisation signal blocks, SSBs, in a plurality of beams in different directions, respectively, during a synchronisation signal block burst with re-allocation of the transmission of the SSB beams according to an embodiment.

FIG. 8 schematically illustrates a multi-transceiver-point cell deployment, where a plurality of transceiver points, TRXPs, of a multi-TRXP cell deployment operate under a same cell identity, ID, and arranged to consecutively transmit a plurality of synchronisation signal blocks, SSBs, in a plurality of beams in different directions, respectively, during a synchronisation signal block burst with re-allocation of the transmission of the SSB beams according to an embodiment. There are three nodes TRXP1, TRXP2 and TRXP3 forming one multi-TRXP cell. The described example is illustrated to use a distributed coordination by the transport network connections between the nodes, but the same functionality may be achieved using a centralized coordination function as mentioned above. Here, one of the nodes TRXP 3 is illustrated to have reallocated the order of beams such that no overlaps in time and space occurs. A UE 800 operating in an area that originally would be exposed to overlapping beams would thus not encounter any issues in that respect.

An operating scenario may be that a UE 802 selects RA window and RA preamble signature using info from received PBCH, RMSI based on time index in best SSB beam, e.g. TRXP3, SSB4. A RA procedure, as will be demonstrated in greater detail with reference to FIG. 11 below, takes place and may include that the TRXPs run RA receiver using signatures valid for each RA window. Antenna data may be recorded and saved, which will be further elucidated with reference to FIG. 9 below. TRXP3 detects the random access in beam 4. To limit the number of estimations, the TRXP that detects a random access may verify that the RA satisfies a defined quality threshold to trigger an estimation. The purpose is to avoid beam relation estimations in case the UE is very close to the TRXP. This can e.g. be decided based on the received power of the random access, which can be compared with a defined threshold, and/or by the UL timing estimation, i.e. from the RA arrival time in the RA reception window. TRXPs part of the same cell exchange information. TRXP 1 and 2 are informed of the RA detection in TRXP3 beam 4.

The beam relation estimation phase, which is further elucidated with reference to FIG. 12 below, includes that the TRXP 1 and TRXP 2 can re-run the RA process using recorded data corresponding to RA time for beam 4, apply "beam weights" used for beam 1, 2, 3, 5 and 6, and match against preambles associated with beam 4. The TRXP 2 may then get a RA detection in beam 5 and 6 with a quality above the defined threshold, while TRXP 1 may not detect and random access. The TRXPs exchange information about the result of the beam relation estimation phase, and the procedure can go on to a beam coordination phase, which will be further elucidated with reference to FIG. 13. When enough information about RA history and SSBs has been gathered, e.g. forming statistics which are used as a basis, to be able to decide on an update of the SSB beam configuration for the different TRXPs in the cell. Enough history information can e.g. be considered if more than a threshold number of beam estimations have been triggered from one and the same beam. Other additional criteria may be added, such as a threshold for number of successful RA detections during playback of recorded data for a beam. Depending on if good correlation or not is wanted between beams from different TRXPs, the SSB-to-beam allocation may be altered in the TRXPs, and information may be used for cell and TRXP neighbour relations.

Returning to the reallocations made by TRXP 3, we observe the UE 800 and a UE 804. Assume that they have previously been through the RA procedure similar to demonstrated above. From the procedure, it was found that the UE 800 was in an overlapping area of SSB5 from both TRXP 2 and TRXP 3. Similarly, the UE 804 was found to be in overlapping area of SSB2 from both TRXP1 and TRXP 3. From this gathered knowledge, TRXP 3 reallocated its beams in line with the illustration of FIG. 8, which in this example was made by swapping SSB2 and SSB3, and by swapping SSB5 and SSB6 for TRXP 3.

Figure 9:
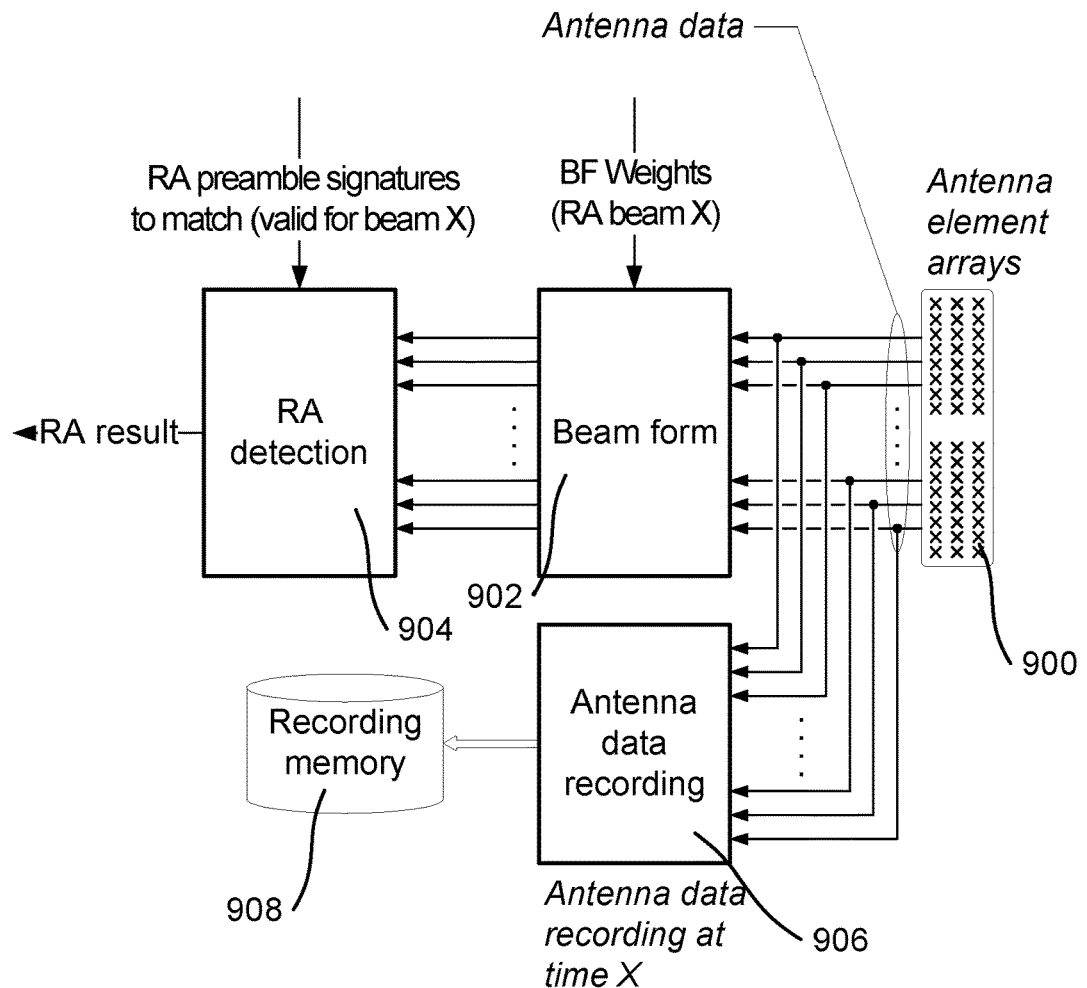
FIG. 9 is a block diagram schematically illustrating elements for RA reception and recording.

FIG. 9 is a block diagram schematically illustrating elements for RA reception and recording of an TRXP. An antenna array 900 is used for transmission and reception of signals. For example, the antenna array 900 is used for the provision of beamformed SSBs, receiving RA transmissions from UEs, etc. For the provision of directional properties of the antenna array, beamforming weights are applied. For reception, a signal from one direction will be distinguished from signals from other directions by application of the beamforming weights in a reception beamforming circuit 902 such that upon reception of RA from a UE, the RA is detected in an RA detector 904 which provides a RA result based on the received signal and feasible RA preamble signatures to be recognised. For respective RA window, antenna data is taken from the antenna array 900 and provided to an antenna data recording circuit 906 which represents the antenna data for the time of respective RA window and stores the representation in a memory 908. The stored representations may then be shared with other TRXPs upon reception of an appropriate RA.

Figure 10:
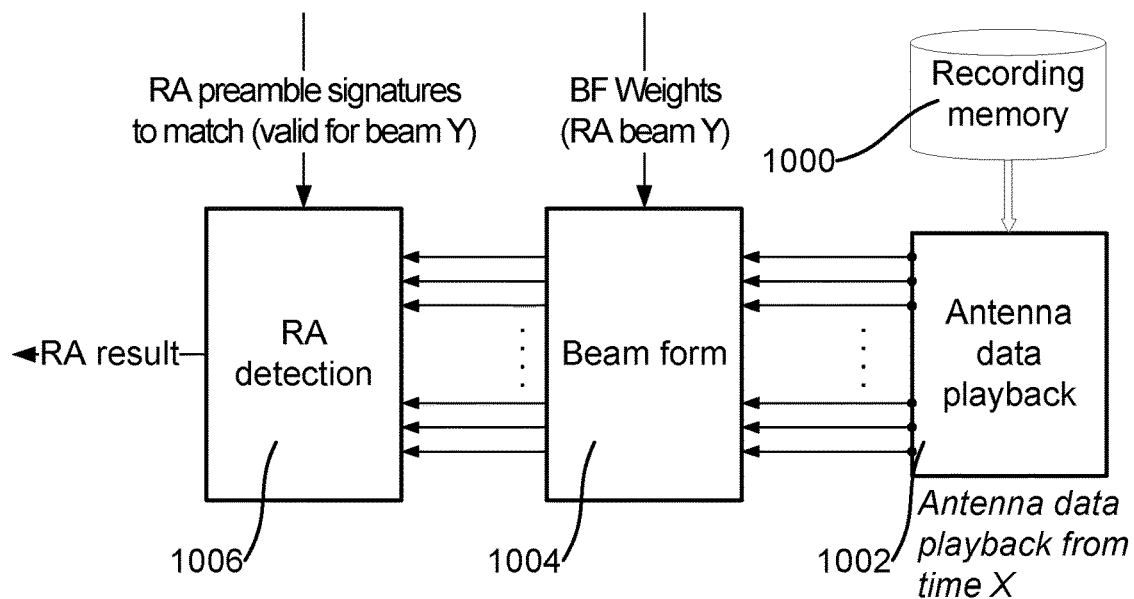
FIG. 10 is a block diagram schematically illustrating elements for playback of recorded data and RA detection.

FIG. 10 is a block diagram schematically illustrating elements for playback of recorded data and RA detection in a TRXP. Representations of antenna data for a time when RA was received by the TRXP itself or another TRXP are stored in a memory 1000. The stored antenna data is provided to an antenna data playback circuit 1002 which provides a replica of the received signal to a beamforming circuit 1004 which applies beamforming weights for a desired direction such that the RA is reproduced and can be detected in an RA detection circuit 1006 which provides a RA result based on the received signal and feasible RA preamble signatures to be recognised.

By the arrangements demonstrated with reference to FIGS. 9 and 10, processing of TRXP beam relationships may be performed offline such that estimation can be made by calculation of recorded antenna data related to neighbour TRXP transmissions and RA history, and own transmission history.

Figure 11:
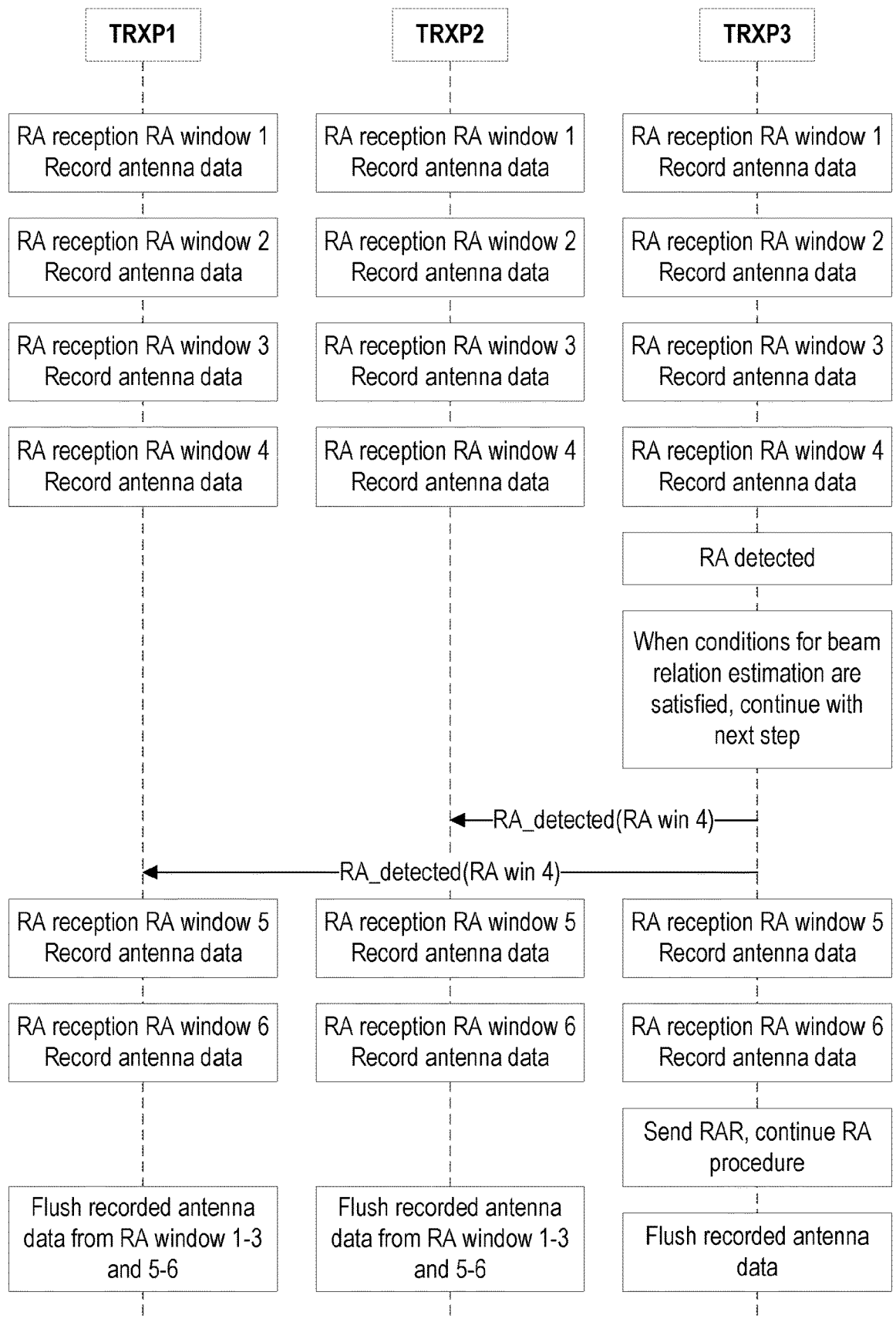
FIG. 11 is a signal and action diagram schematically illustrating a RA procedure according to an example.

FIG. 11 is a signal and action diagram schematically illustrating a RA procedure according to an example. The respective TRXPs of the cell attempt to make RA reception in the respective RA windows. In this example, TRXP 3 manages to detect an appropriate RA in RA window 4 wherein the TRXP 3 shares information about the detected RA with the other TRXPs. The TRXP 3 also transmits a RA response, RAR, to the UE and continues RA procedure for normal connection or re-connection. The TRXPs may flush recordings of data that have shown to make no progress or is already acted on. It is to be noted that this is the RA process loop, and history on a higher level may still be stored for statistical evaluation and reallocation based thereon, as demonstrated above, and further elucidated with reference to FIG. 12, which is a signal and action diagram schematically illustrating beam relation estimation according to an embodiment, and FIG. 13, which is a signal and action diagram schematically illustrating beam coordination according to an embodiment.

Figure 12:
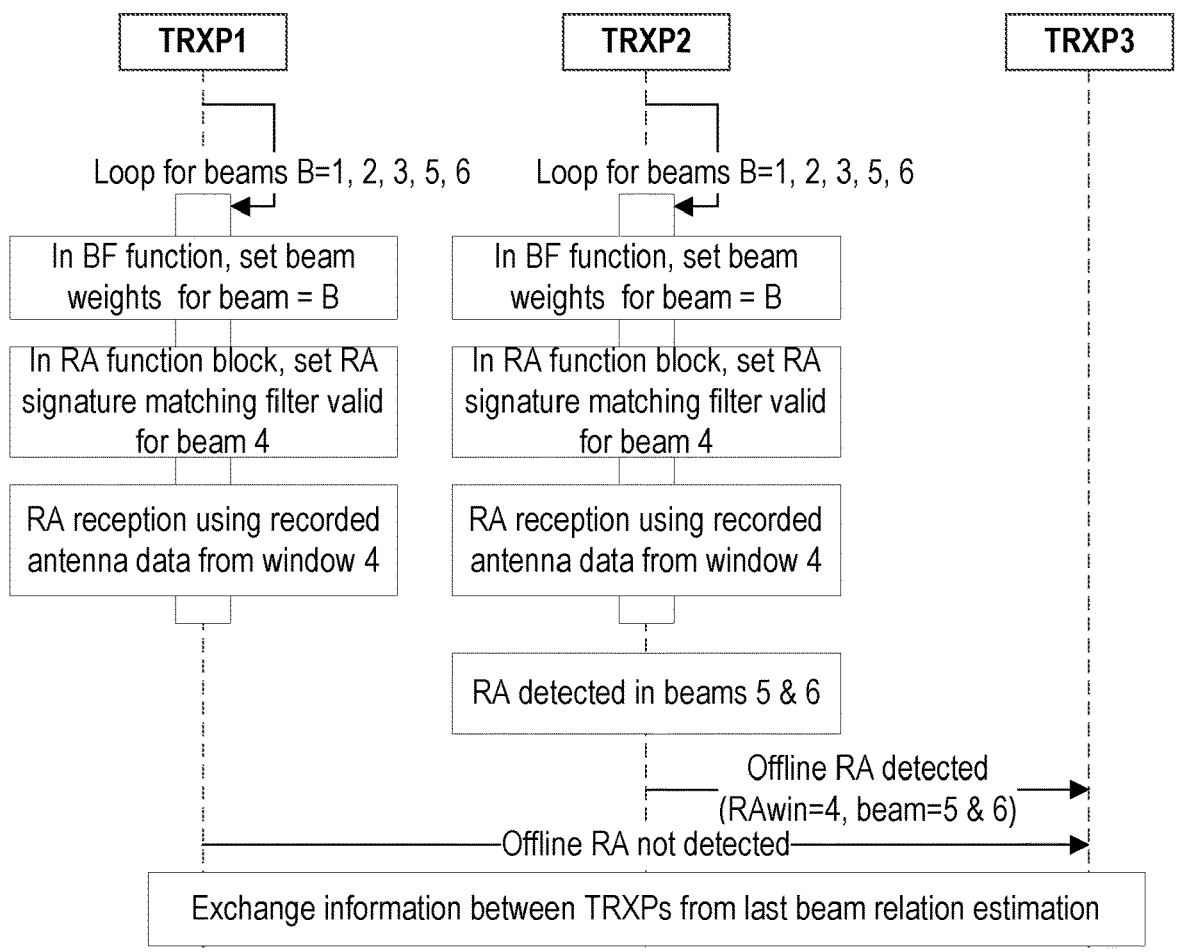
FIG. 12 is a signal and action diagram schematically illustrating beam relation estimation according to an embodiment.
Figure 13:
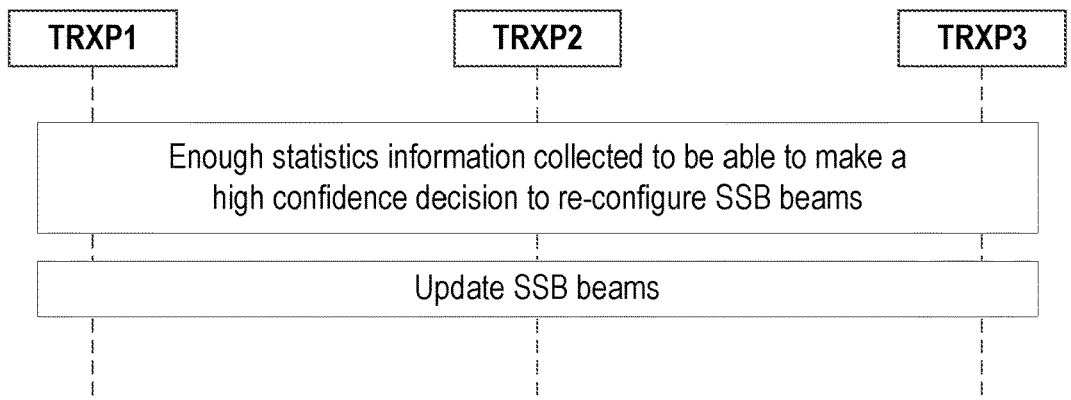
FIG. 13 is a signal and action diagram schematically illustrating beam coordination according to an embodiment.

The example illustrated in FIG. 12 is based on the scenario of FIG. 11. Thus, TRXP 3 is in the RA processing for the recognised RA in beam 4, and the TRXP 1 and the TRXP 2 are looping for looking at possible RAs in the remaining beams. Simultaneously, or when system resources so allow, the beamforming is set by beam weights for the beamforming circuit and recorded antenna data is processed to examine whether RA related to RA reception window 4 can be found. In this example, the TRXP 1 fails to find any RA in this examination, while the TRXP 2 manage to find it for beam weights corresponding to beams 5 and 6. This information is shared with the TRXP 3. In a similar way, any such found RAs, or information that no RAs are found, may be shared between the TRXPs. FIG. 13 then illustrates that respective TRXP checks whether there is information reliably indicating that a decision on re-allocation of beams should be made. If that is the case, one or more beams may be re-allocated. Optionally, data about such re-allocation is provided to the other TRXPs, wherein coordination is indirectly provided. Another option is that the re-allocation may be coordinated by a dedicated entity shared by the TRXPs.

Figure 14:
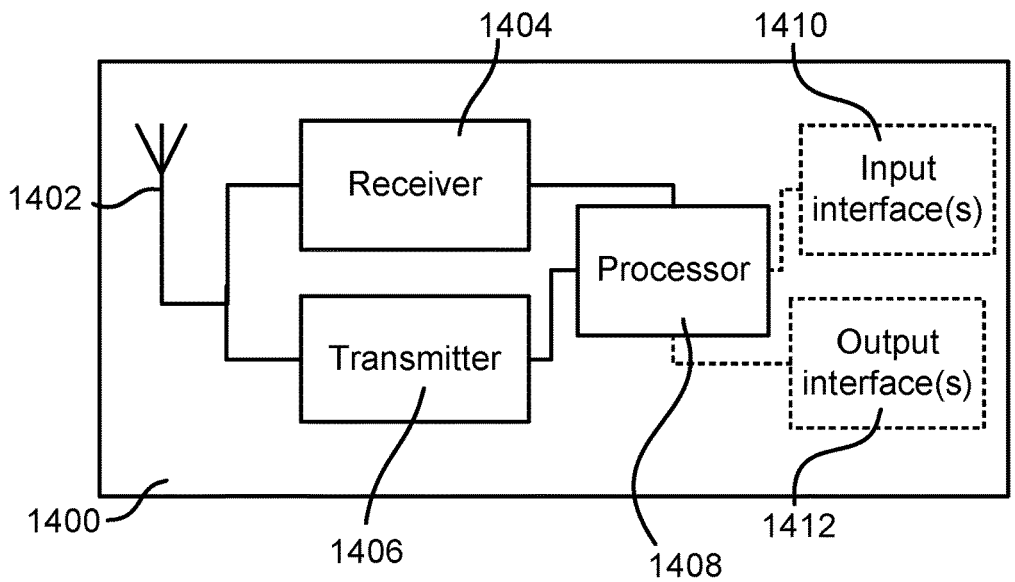
FIG. 14 is a block diagram schematically illustrating a TRXP according to an embodiment.

FIG. 14 is a block diagram schematically illustrating a TRXP 1400 according to an embodiment. The TRXP comprises an antenna arrangement 1402 which comprises an antenna array, a receiver 1404 connected to the antenna arrangement 1402, a transmitter 1406 connected to the antenna arrangement 1402, a processing element 1408 which may comprise one or more circuits, one or more input interfaces 1410 and one or more output interfaces 1412. The interfaces 1410, 1412 can be operator interfaces and/or signal interfaces, e.g. electrical or optical. The TRXP 1400 is arranged to operate in a cellular communication network employing multi-TRXP cells. In particular, by the processing element 1408 being arranged to perform the embodiments demonstrated with reference to FIGS. 1 to 13, the TRXP 1400 is capable of reallocating beams, and also to receive and share information from/with other TRXPs of the cell. The processing element 1408 can also fulfil a multitude of tasks, ranging from signal processing to enable reception and transmission since it is connected to the receiver 1404 and transmitter 1406, executing applications, controlling the interfaces 1410, 1412, etc.

Figure 15:
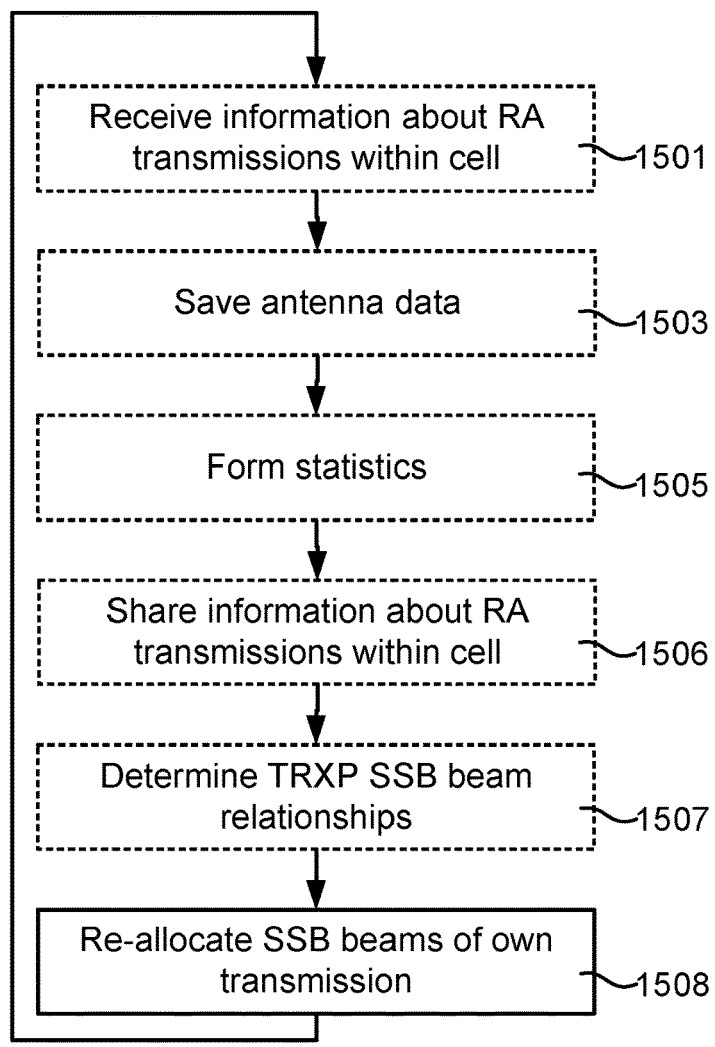
FIG. 15 is a flow chart illustrating a method according to embodiments.

FIG. 15 is a flow chart illustrating a method according to embodiments. Basically, the method includes re-allocation 1508 of SSB beams transmitted by the TRXP.

According to one embodiment, where reference may be made to FIG. 8, the re-allocation 1508 of SSB beams may be such that a receiving entity of the SSB beam transmissions is less likely than before the re-allocation to receive simultaneous SSB beams from two or more of the plurality of the TRXPs of the cell. One advantage of this is that it provides for a less complex reception by a UE and/or an improved reception with available capabilities of the UE. Another advantage is that it enables the possibility to create large cells using many TRXPs. As there in practice is a limited number of time indices, the system will locally run out of indices if a unique index to each beam is used. Thus, if re-use of the same time index in different TRXPs, it is provided that a cell with no limitation of number of TRXPs.

Figure 16:
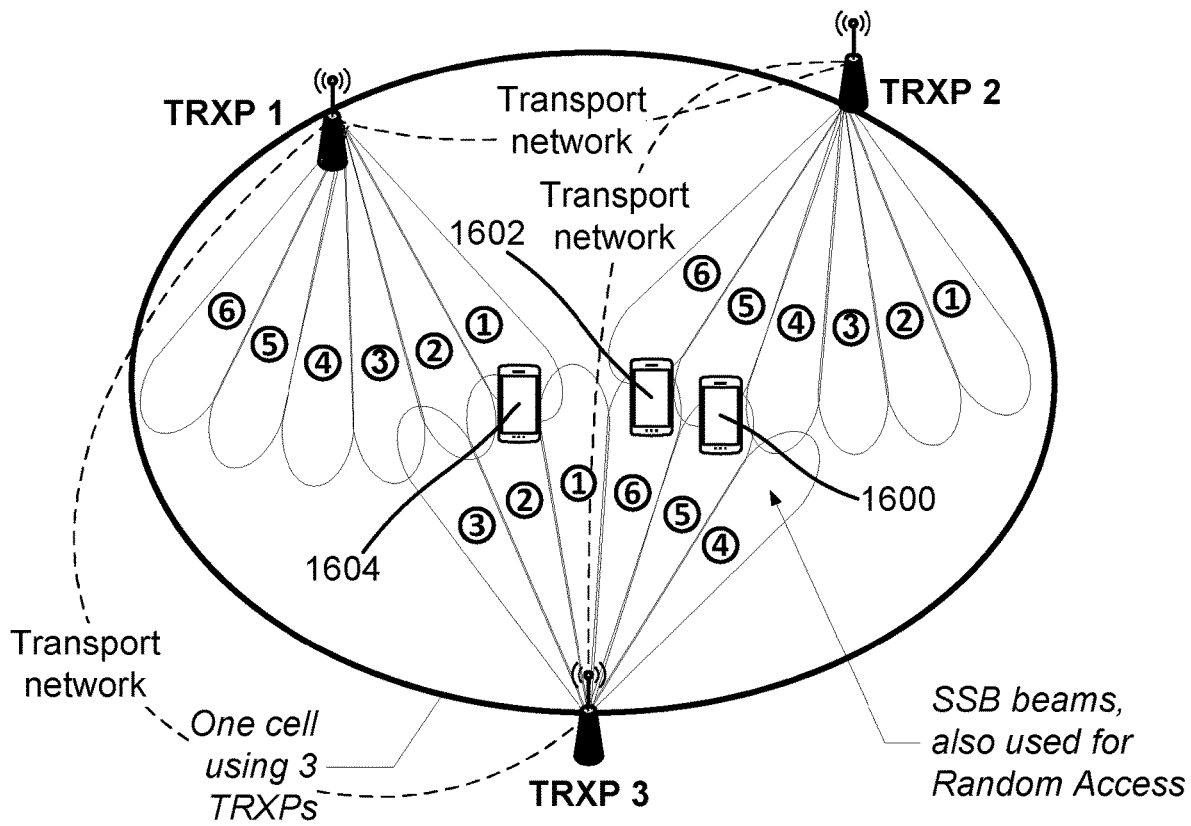
FIG. 16 schematically illustrates a multi-transceiver-point cell deployment, where a plurality of transceiver points, TRXPs, of a multi-TRXP cell deployment operate under a same cell identity, ID, and arranged to consecutively transmit a plurality of synchronisation signal blocks, SSBs, in a plurality of beams in different directions, respectively, during a synchronisation signal block burst with re-allocation of the transmission of the SSB beams according to an embodiment.

According to one embodiment, where reference may be made to FIG. 16, the re-allocation 1508 of SSB beams may be such that a receiving entity of the SSB beam transmissions is more likely than before the re-allocation to receive simultaneous SSB beams from two or more of the plurality of the TRXPs of the cell. One advantage of this is that it may enable combining, e.g. soft-combining, of information from the beams. This will be further elucidated with reference to FIG. 16. One advantage is that combining of signals from beams having the same indices are more often feasible which may improve reception by the UE, especially where signal from respective beam are weak, e.g. at relatively long range from respective TRXP. On the other hand, the combining will put demands on UE capabilities since signal combining implies demand on signal processing capabilities of the UE.

FIG. 16 schematically illustrates a multi-transceiver-point cell deployment, where a plurality of transceiver points, TRXPs, of a multi-TRXP cell deployment operate under a same cell identity, ID, and arranged to consecutively transmit a plurality of synchronisation signal blocks, SSBs, in a plurality of beams in different directions, respectively, during a synchronisation signal block burst with re-allocation of the transmission of the SSB beams according to an embodiment. Similar to the example of FIG. 8, for the sake of easier understanding, there are three nodes TRXP1, TRXP2 and TRXP3 forming one multi-TRXP cell. The described example is illustrated to use a distributed coordination by the transport network connections between the nodes, but the same functionality may be achieved using a centralized coordination function as mentioned above. Here, one of the nodes TRXP 3 is illustrated to have reallocated the order of beams such that overlaps in time and space occurs where possible. A UE 1600 operating in an area that originally may be exposed to overlapping beams may thus be able to combine signals from beams with index 5 from TRXP2 and TRXP3, and no re-allocation is thus made. A UE 1602 operating in an area that originally may be exposed to beams with index 6 from TRXP2 and index 4 from TRXP3, may thus be able to combine signals from beams with index 6 from TRXP2 and TRXP3 upon re-allocation by TRXP3. A UE 1604 operating in an area that originally may be exposed to beams with index 1 or 2 from TRXP 1 and index 3 or 2 from TRXP3 may thus be able to combine signals from beams with index 1 and 2 from TRXP1 and TRXP3 upon re-allocation of beam with index 1 by TRXP3.

The different approaches demonstrated above provides for different advantages. According to one embodiment, the re-allocation strategy may be adaptive, i.e. select whether to re-allocate for a receiving entity of the SSB beam transmissions to be less likely or more likely than before the re-allocation to receive simultaneous SSB beams from two or more of the plurality of the TRXPs of the cell, based on a current situation. Situation awareness for the adaptation may include knowledge about UE capabilities, UE locations, number of TRXPs of the cell and possibly neighbouring cells, etc.

Returning to FIG. 15, different features of how to decide on the re-allocation 1508 for the different approaches demonstrated above and to collect information for the decision are also provided, but due the ability to configure the collection and deciding in a multitude of ways, the features 1501-1507 are depicted by hashed line boxes to emphasize their optional nature for at least some configurations.

The feature of receiving 1501 information about RA transmissions within the cell may itself comprise one or more options. One feature is that the RA transmission is received by the TRXP itself. Another feature is that the RA transmission is received by another TRXP of the cell and the information is shared by the another TRXP and received by the TRXP. Information may even be gathered from neighbouring cells to improve mobility.

The feature of saving 1503 antenna data similarly to the receiving 1501 of information may comprise one or more options. The saving 1503 of antenna data may be own antenna data being saved. The saving may also be saving received 1501 antenna data from another TRXP.

The feature of forming 1505 statistics relates to extracting desired information on which decisions on re-allocation 1508 are based. Here, the term "statistics" may be statistically processed information providing a model or metric, but may as well simply be extracted history which may be of importance for the decision making.

The feature of sharing 1506 information about RA transmissions within the cell, and possibly also within neighbouring cells, may comprise transmitting raw data, e.g. antenna data, to the other TRXPs, or transmitting processed data, e.g. provided by the "statistics" forming 1505 feature, to the other TRXPs.

The feature of determining 1507 TRXP SSB beam relationships may include deriving, from explicit or implicit data produced by one or more of the features demonstrated above, whether one or more SSB beams from the other TRXPs interacts with any of the own SSB beams in a way that is not desired.

Based on one or more of the information, data, indications, etc. provided by one or more of the features 1501-1507 demonstrated above, the re-allocation 1508 of SSB beams may be decided and performed.

Figure 17:
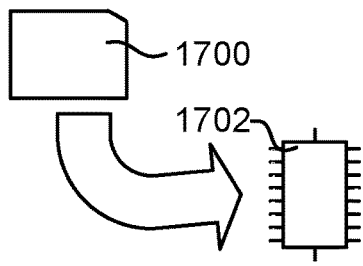
FIG. 17 schematically illustrates a computer-readable medium and a processing device.

The methods according to the present invention is suitable for implementation with aid of processing means, such as computers and/or processors, especially for the case where the processing element 1408 demonstrated above comprises a processor handling decisions on re-allocation of beams, and the processing for enabling such decisions as demonstrated above. Therefore, there is provided computer programs, comprising instructions arranged to cause the processing means, processor, or computer to perform the steps of any of the methods according to any of the embodiments described with reference to FIGS. 1 to 13, 15, and 16. The computer programs preferably comprise program code which is stored on a computer readable medium 1700, as illustrated in FIG. 17, which can be loaded and executed by a processing means, processor, or computer 1702 to cause it to perform the methods, respectively, according to embodiments of the present invention, preferably as any of the embodiments described with reference to FIGS. 1 to 13, 15, and 16. The computer 1702 and computer program product 1700 can be arranged to execute the program code sequentially where actions of the any of the methods are performed stepwise, but the nature of the approach reasonably implies that execution is performed on a real-time basis. The processing means, processor, or computer 1702 is preferably what normally is referred to as an embedded system. Thus, the depicted computer readable medium 1700 and computer 1702 in FIG. 17 should be construed to be for illustrative purposes only to provide understanding of the principle, and not to be construed as any direct illustration of the elements.

The invention claimed is:

1. A Transceiver Point (TRXP) configured to operate in a multi-TRXP cell deployment; the multi-TRXP cell deployment being where a plurality of TRXPs of the multi-TRXP cell deployment operate under a same cell identity (ID), and consecutively transmit a plurality of synchronization signal blocks (SSBs) in a plurality of beams in different directions, respectively, during a synchronization signal block burst; the TRXP comprising:
 processing circuitry;
 memory containing instructions executable by the processing circuitry whereby the TRXP is operative to:
  reallocate the transmission of the SSB beams for enabling a receiving entity of the SSB beam transmissions to improve synchronization signal reception compared with what is feasible before the reallocation;
 wherein the reallocation comprises allocation of SSB beam transmissions such that the receiving entity is either:

less likely than before the reallocation to receive simultaneous SSB beams from two or more of the plurality of the TRXPs of the cell; or more likely than before the reallocation to receive simultaneous SSB beams from two or more of the plurality of the TRXPs of the cell.

2. The TRXP of claim 1:
further comprising a receiver configured to receive transmission information from other TRXPs of the multi-TRXP cell deployment;
wherein the instructions are such that the TRXP is operative to determine TRXP beam relationships on which the reallocation of the transmission of the SSB beams is based.

3. The TRXP of claim 1, wherein the reallocation of the transmission of the SSB beams is such that a time index of beams used by other TRXPs of the multi-TRXP cell deployment is reusable by the TRXP.

4. The TRXP of claim 1, wherein the instructions are such that the TRXP is operative to:
receive random access (RA) transmissions from User Equipments (UEs) of the cell;
share information about the received RA transmissions; and
receive information about received RA transmissions from other TRXPs of the multi-TRXP cell deployment.

5. The TRXP of claim 4, wherein the reallocation of the transmission of the SSB beams is based on RA receptions from UEs of the cell.

6. The TRXP of claim 4, wherein the reallocation procedure is performed where determinations are based on reception history of RA transmissions from UEs of the cell such that real-time coordination between the TRXPs of the multi-TRXP cell deployment is avoided.

7. The TRXP of claim 4, wherein the instructions are such that the TRXP is operative to save antenna data of the received RA transmissions from UEs of the cell during a RA receive window associated with an SSB beam, wherein the information about the received RA transmissions to be shared comprises information related to the saved antenna data.

8. The TRXP of claim 7, wherein the shared information related to the saved antenna data comprises information about RA receptions, which are associated with respective SSB beam from UEs of the cell, during the RA receive window.

9. The TRXP of claim 7, wherein the instructions are such that the TRXP is operative to receive the information about received RA transmissions from other TRXPs of the multi-TRXP cell deployment related to saved antenna data from at least a subset of the other TRXPs of the multi-TRXP cell deployment, where the saved antenna data is related to a RA receive window associated with an SSB beam.

10. The TRXP of claim 1, wherein the instructions are such that the TRXP is operative to:
collect information about RA transmissions within the cell;
aggregate at least a subset of the collected information; and
provide a reallocation scheme for the transmission of the SSB beams based on the aggregated information.

11. A method, performed by a Transceiver Point (TRXP) configured to operate in a multi-TRXP cell deployment, the multi-TRXP cell deployment being where a plurality of TRXPs of the multi-TRXP cell deployment operate under a same cell identity (ID), and consecutively transmit a plurality of synchronization signal blocks (SSBs) in a plurality of beams in different directions, respectively, during a synchronization signal block burst; the method comprising:
reallocating the transmission of the SSB beams transmitted by the TRXP for enabling a receiving entity of the SSB beam transmissions to improve synchronization signal reception compared with what is feasible before the reallocation;
wherein the reallocating comprises allocating SSB beam transmissions such that the receiving entity is either:
less likely than before the reallocation to receive simultaneous SSB beams from two or more of the plurality of the TRXPs of the cell; or
more likely than before the reallocation to receive simultaneous SSB beams from two or more of the plurality of the TRXPs of the cell.

12. The method of claim 11, further comprising:
receiving transmission information from other TRXPs of the multi-TRXP cell deployment; and
determining TRXP beam relationships;
wherein the reallocating of the transmission of the SSB beams is based on the received transmission information.

13. The method of claim 11, wherein the reallocating of the transmission of the SSB beams comprises reallocating such that a time index of beams used by other TRXPs of the multi-TRXP cell deployment is reusable by the TRXP.

14. The method of claim 11, further comprising:
receiving random access (RA) transmissions from User Equipments (UEs) of the cell;
sharing information about the received RA transmissions; and
receiving information about received RA transmissions from other TRXPs of the multi-TRXP cell deployment.

15. The method of claim 14, wherein the reallocating of the transmission of the SSB beams is based on RA receptions from UEs of the cell.

16. The method of claim 14, wherein the reallocating is performed on determinations based on reception history of RA transmissions from UEs of the cell such that real-time coordination between the TRXPs of the multi-TRXP cell deployment is avoided.

17. The method of claim 14:
further comprising saving antenna data of the received RA transmissions from UEs of the cell during a RA receive window associated with an SSB beam;
wherein the sharing of information about the received RA transmissions comprises sharing information related to the saved antenna data with at least a subset of the other TRXPs of the multi-TRXP cell deployment.

18. The method of claim 17, wherein the shared information related to the saved antenna data comprises information about RA receptions, which are associated with respective SSB beam from UEs of the cell, during the RA receive window.

19. The method of claim 17, further comprising receiving information about received RA transmissions from other TRXPs of the multi-TRXP cell deployment related to saved antenna data from at least a subset of the other TRXPs of the multi-TRXP cell deployment, where the saved antenna data is related to a RA receive window associated with an SSB beam.

20. The method of claim 11, further comprising:
collecting information about RA transmissions within the cell;
aggregating at least a subset of the collected information; and providing a reallocation scheme for the transmission of the SSB beams based on the aggregated information.

21. The method of claim 20, further comprising forming statistics on the collected information about RA transmissions within the cell, wherein the providing of the reallocation scheme for the transmission of the SSB beams is based on the statistics.

\* \* \* \* \*